United States Patent
Kesper

(10) Patent No.: US 9,337,463 B2
(45) Date of Patent: May 10, 2016

(54) SEPARATOR

(71) Applicant: Hoppecke Batterien GmbH & Co. KG, Brilon (DE)

(72) Inventor: Heinrich Kesper, Willingen (DE)

(73) Assignee: Hoppecke Batterien GmbH & Co. KG, Brilon (DE)

( * ) Notice: Subject to any disclaimer, the term of this patent is extended or adjusted under 35 U.S.C. 154(b) by 11 days.

(21) Appl. No.: 14/561,555

(22) Filed: Dec. 5, 2014

(65) Prior Publication Data

US 2015/0162589 A1    Jun. 11, 2015

(30) Foreign Application Priority Data

Dec. 11, 2013   (EP) ..................................... 13196706

(51) Int. Cl.
| | |
|---|---|
| *H01M 2/16* | (2006.01) |
| *H01M 2/18* | (2006.01) |
| *H01M 2/12* | (2006.01) |
| *H01M 2/14* | (2006.01) |
| *H01M 4/14* | (2006.01) |
| *H01M 10/06* | (2006.01) |

(52) U.S. Cl.
CPC ........ *H01M 2/18* (2013.01); *H01M 2/12* (2013.01); *H01M 2/145* (2013.01); *H01M 4/14* (2013.01); *H01M 10/06* (2013.01); *Y02E 60/126* (2013.01)

(58) Field of Classification Search
CPC ....... H01M 10/06; H01M 2/12; H01M 2/145; H01M 2/18; H01M 4/14
See application file for complete search history.

(56) References Cited

U.S. PATENT DOCUMENTS

| | | | |
|---|---|---|---|
| 2,570,677 A | 10/1951 | Honey et al. | |
| 4,680,242 A | 7/1987 | Simonton et al. | |
| 5,156,932 A | * 10/1992 | Dougherty | .......... H01M 2/1229 29/623.2 |
| 5,455,125 A | 10/1995 | Matsumoto et al. | |
| 2012/0077075 A1 | 3/2012 | Tani et al. | |

FOREIGN PATENT DOCUMENTS

| | | |
|---|---|---|
| JP | 2002324571 A | 11/2002 |
| WO | WO-2013180198 A1 | 12/2013 |

* cited by examiner

*Primary Examiner* — Patrick Ryan
*Assistant Examiner* — Ben Lewis
(74) *Attorney, Agent, or Firm* — Harness, Dickey & Pierce, P.L.C.

(57) ABSTRACT

A separator for an electrode plate of a plate-shaped electrode of a battery, particularly a lead-acid battery, comprising a separator pocket providing a receiving space for said electrode plate and including two separator sheets bearing on each other, which are welded to each other along their respective longitudinal sides and upper front sides, the welding seam interconnecting said upper front sides presenting an interruption, which forms a recess for a current-collecting lug disposed on the upper outer edge of the electrode plate to pass through, said welding seam, for forming a degasification opening, being interrupted in a rim portion adjacent to a longitudinal side, a second welding seam spaced from said welding seam being provided which is positioned directly vis-à-vis the degasification opening of the first welding seam.

8 Claims, 3 Drawing Sheets

SEPARATOR

CROSS-REFERENCE TO RELATED APPLICATIONS

This application claims the benefit and priority of EP13196706.9, filed on Dec. 11, 2013. The entire disclosure of the above application is incorporated herein by reference.

FIELD

This invention relates to a separator for an electrode plate of a plate-shaped electrode of a battery, particularly a lead-acid battery, comprising a separator pocket providing a receiving space for said electrode plate, said separator pocket having two separator sheets bearing on each other, which are welded to each other at their respective longitudinal sides and upper front sides, the welding seam interconnecting said upper front sides presenting an interruption, which forms a recess for a current-collecting lug disposed on the upper outer edge of said electrode plate to pass through.

BACKGROUND

Rechargeable batteries in general and lead-acid batteries in particular per se are well known in prior art so that supporting documents need not be cited at this point.

A battery of this generic type typically comprises a battery housing having electrodes arranged therein that are surrounded by a mostly liquid electrolyte when used as intended. The design of plate-shaped electrodes is rather popular. While the negative electrodes usually comprise an electrode plate having a grid-like design in which the grid meshes are filled with an active mass, the positive electrodes usually have a plurality of cores arranged on a common electrode bridge, each core being disposed inside a tube pocket tube filled with an active mass.

Said electrodes are arranged adjacent to each other inside the battery housing, wherein negative electrodes alternate with positive electrodes. To prevent shorting, a separator is respectively arranged between a negative electrode and a positive electrode, which electrically decouples these two electrodes from each other.

Different separator configurations are known in prior art. A typical type of construction is a separator, which is designed as a separator pocket. The same provides a receiving space for the electrode plate of the negative electrode. In the finally mounted state, said separator pocket surrounds the electrode plate of the negative electrode while receiving it like a wrapping.

Said separator pocket is composed of two single separator sheets bearing on each other. Along their longitudinal sides, said separator sheets are connected to each other, preferably by welding. Normally, said separator pocket is sealed along its lower outer edge, whereas the upper outer edge has an open configuration for being equipped with said electrode plate.

When a battery is used as intended, it cannot be avoided that particles stemming from the active mass and present in the electrolyte accumulate on the electrode plate of the negative electrode. These particles accumulate on the upper outer edge of the electrode plate as a result of the separator pocket being open on the upper side. Even if the battery is used as prescribed, these particles accumulating on the upper outer edge of the electrode plate of the negative electrode may form a shorting bridge to an adjacent positive electrode. This phenomenon is also called "mossing".

To prevent the accumulation of electrically conducting particles on the electrode plate of the negative electrode leading to the formation of a shorting bridge, it has been proposed to seal the separator pocket of the negative electrode also on its upper outer edge. Such a construction is known for instance from U.S. Pat. No. 2,570,677 and U.S. Pat. No. 4,680,242.

Separator pockets sealed all around are problematic in that the separator pocket may swell as a result of gases released during normal usage. This may affect normal operation of the battery. However, the result of the accumulation of released gas within said separator pocket is above all a kind of gas occupation of the electrode so that the electrolyte can no longer or only partly reach the electrode. This may even result in a complete failure of the electrode.

To solve this problem, it has been proposed in U.S. Pat. No. 4,680,242 to make the recess in the separator pocket provided for the passage of a current-collecting lug disposed on the upper outer edge of the electrode plate slightly larger than said current-collecting lug. Gas that is released during operation can thus escape via said recess formed in said separator pocket for the current-collecting lug to pass through.

The construction known from U.S. Pat. No. 4,680,242 has the disadvantage that for the purpose of a degasification, said recess for the current-collecting lug must be dimensioned sufficiently large for allowing the floating particles from the electrolyte to flow into the separator pocket and to settle on the electrode plate, especially in the region of the current-collecting lug. Accordingly, this may cause undesired fouling of the electrode despite the sealed configuration of the separator pocket. With an advanced accumulation of particles, said recess for the current-collecting lug becomes clogged at least partially, so that sufficient degasification cannot take place any longer, and the risk of a battery failure as a result of a swelling phenomena of the separator pocket increases.

SUMMARY

In view of the above, it is an object of the invention to propose a separator, which allows the accumulation of electrically conducting particles on the electrode plate to be minimized while simultaneously avoiding swelling effects.

To achieve this object, the invention proposes a separator of the type described above which is characterized in that, for forming a degasification opening, the welding seam is interrupted in a rim portion which is adjacent to a longitudinal side, wherein a second welding seam spaced from said welding seam is provided which is positioned directly vis-à-vis the degasification opening of the first welding seam.

In the embodiment according to the invention, said separator pocket includes a degasification opening. To this end, the welding seam formed along the upper front sides of the separator sheets is configured so as to be interrupted, namely in a rim portion adjacent to a longitudinal side. Accordingly, gas produced during normal use can escape via said recess provided for the passage of the current-collecting lug on the one hand and via said additional degasification opening on the other hand.

According to the invention, a second welding seam is provided. This second welding seam is formed in a manner spaced from the first welding seam. It therefore serves as a spacer for an electrode plate received by the separator pocket during normal use. This second welding seam accordingly ensures that the electrode is spaced from the first welding seam inside the separator pocket. The distance between the first and the second welding seams is 1.5 cm, for example.

The second welding seam is positioned directly vis-à-vis the degasification opening formed in the first welding seam. Accordingly, it constitutes a flow barrier.

With the construction according to the invention, substantially two advantageous effects are achieved. Degasification is allowed on the one hand and takes place via both said recess provided for the current-collecting lug and said additional degasification opening. On the other hand, the formation of a shorting bridge caused by particles accumulating on the electrode plate of the negative electrode is securely prevented. The separator pocket is sealed on the top, with the exception of said recess, which is provided for the current-collecting lug to pass through. Accordingly, compared to a separator pocket that is completely open on the upper side, the accumulation of possible particles is impeded. The positioning of the second welding seam in relation to the degasification opening forms a flow barrier. There is produced a labyrinth duct. Accordingly, particles that may migrate into the separator pocket via said degasification opening, will not settle directly on the electrode plate, but on the second welding seam. Any electrical contact with the electrode plate is thus prevented and fouling does not occur. In the case of degasification, particles loosely deposited on the second welding seam can then be expelled again from the separator pocket at least partially. The spaced arrangement of the second welding seam from the first welding seam yields an additional positive effect. Under normal use, said electrode plate is positioned in a manner spaced from the upper outer edge of the separator pocket thanks to the spaced arrangement of the second welding seam from the first welding seam. Thus a clearance is produced between the upper outer edge of the electrode plate on the one hand and the outer edge of the separator pocket which is sealed except of the recess for the current-collecting lug and the degasification opening, on the other hand. Should particles penetrate into the separator pocket and then adhere to the electrode plate despite the above-described labyrinth duct, such deposits can initially extend into the clearance produced by the spaced arrangement of the electrode plate. Undesirable clogging of the recess provided for the current-collecting lug and/or of the degasification opening can thus be prevented. Accordingly, operational reliability of the battery is ensured even if particles and/or particles from the electrolyte should migrate through the labyrinth duct on the side of the separator pocket.

With the construction according to the invention there is finally proposed a separator that helps to prevent as far as possible that electrically conducting particles accumulate on the electrode plate and simultaneously provides for a possibility of degasification. Operational safety is increased by the fact that even in the case of an undesirable accumulation of particles, the openings provided for degasification will not become clogged. The second welding seam serving as a spacer is disposed directly vis-à-vis the degasification opening so that no particles can accumulate on the electrode plate, at least on the side directly vis-à-vis the degasification opening.

A further feature of the invention provides that for forming an additional degasification opening, the first welding seam is interrupted in a rim portion adjacent to the other longitudinal side. The separator pocket according to the invention thus has a first and a second degasification opening. These are respectively formed in a rim portion adjacent to the respective longitudinal side.

The formation of two degasification openings allows for minimizing the size of the recess provided in the upper outer edge of the separator pocket for the current-collecting lug to pass through. Preferably, the material of the separator pocket rests as tightly as possible against the current-collecting lug and thus prevents as far as possible that particles undesirably penetrate into the interior of the separator pocket. Particles possibly accumulating on the separator pocket in the opening area are dragged along in the case of a degasification so that undesirable "mossing" effects directly at the current-collecting lug are minimized to such an extent that no shorting bridge to the neighboring positive electrode will be formed throughout the service life of the battery.

For forming a labyrinth duct, a flow barrier is provided upstream of the degasification opening in the degasification direction. To this end, a third welding seam is provided which is positioned directly vis-à-vis said additional degasification opening. Also this third welding seam is spaced from the first welding seam and acts just like the second welding seam as a spacer for an electrode plate inserted in the separator pocket.

Preferably, the second and the third welding seams are equidistant from the first welding seam. The distance to the upper front side of the separator sheets, i.e. to the upper outer edge of the separator pocket, is 0.5 cm to 2.5 cm, preferably 1.0 cm to 2.0 cm, even more preferably 1.5 cm. Under normal use, the distance from the first welding seam to the second welding seam determines the clearance which is produced between the upper outer edge of the electrode plate on the one hand and the upper outer edge of the separator pocket on the other hand, while particles accumulating on the electrode plate may undesirably "grow into" the said clearance.

The second and the third welding seams have an extent substantially corresponding to the extent of the respectively associated degasification opening. It is thus achieved that the part of the upper outer edge of the electrode plate which directly opposes the respective degasification opening is not exposed, which fact counteracts clogging of the degasification openings by particle accumulations on the side of the electrode plate directly opposing the respective degasification opening.

According to a first alternative, the separator sheets of the separator pocket may be connected and preferably welded to each other along their lower front side opposing the first welding seam. Accordingly, the separator pocket is sealed on the lower side thereof. This has the advantage that particles of the active mass, which possibly separate from the grid of the electrode plate, remain within the separator pocket and cannot migrate into the electrolyte. On the other hand, the separator pocket, which is sealed on its lower side, requires an additional manufacturing step for sealing the lower side of the separator pocket after the electrode plate has been inserted.

Such an additional step is not required if in an alternative configuration said separator pocket is open along its lower outer edge opposing the first welding seam thereof. In this case, the completed separator pocket can be equipped with the electrode plate and then inserted in a battery housing as a finished electrode.

Concerning the process, the above-stated object is achieved by proposing a process for the manufacture of a separator pocket for an electrode plate of a plate-shaped electrode, in which process two endless separator sheets bearing on each other are welded to each other along their longitudinal sides, the separator sheets welded to each other on the longitudinal sides are cut to length at equal distances, and the cut separator sheets are welded to each other along their first front sides while forming a welding seam, wherein said welding seam is formed with a recess for a current-collecting lug disposed on the electrode plate to pass through.

The process provides for the separator pockets being formed from separator sheets. Here, endless separator sheets uncoiled for example from an endless roll are used. Both endless separator sheets are laid on top of each other and are welded to each other along their longitudinal sides, i.e. in the endless direction, thus producing an endless tube.

In a next process step, said endless tube is cut to length. In this manner, the separator pockets are produced in their geometrical dimensions. The separator sheets welded to each other in the longitudinal direction are cut to length at equal distances so that separator pockets having equal geometrical dimensions are produced.

In a final process step, said separator pockets are finished by welding the front sides of the cut separator sheets to each other. The welding seam produced is not continued over the whole length of the front side. Instead a welding seam is produced which includes a recess for a current-collecting lug disposed on the electrode plate to pass through. Accordingly, an interrupted welding seam is produced, said interruption of the welding seam forming said recess for the current-collecting lug.

After the separator pocket has been formed in the above-described manner, the electrode plate can be equipped with an electrode plate via said unsealed lower outer edge of the separator pocket. If desired, also the lower outer edge of the separator pocket can be sealed, for example by welding, after the electrode plate has been inserted in the separator pocket.

As an alternative to the above-described process it can be provided that both endless separator sheets are laid on top of each other under the interposition of equally spaced mutually adjacent electrode plates. This approach has the advantage that the later welding of the separator sheets for forming the separator pocket takes place with an electrode plate already installed between the separator sheets for each subsequent separator pocket, thus forming a final separator pocket already equipped with an electrode plate in a single working step.

A further feature of the invention provides that for forming two degasification openings said welding seam is respectively interrupted in a rim portion adjacent to the longitudinal sides welded to each other. Accordingly, the recess for the current-collecting lug on the one hand and the degasification openings on the other hand are formed in one process step.

On part of the process it also provided that a second and a third welding seam spaced from the first welding seam are formed and are each positioned directly vis-à-vis said two degasification openings. These second and third welding seams in combination with the associated degasification opening form a labyrinth duct and additionally serve as a spacer for one of the electrode plates received by the separator pocket. Thus the above-described advantages are obtained.

It is particularly advantageous if the welding seams are formed and/or the separator sheets are cut to length simultaneously in one process step. The separator sheets can also be cut to length by full penetration welding so that one welding apparatus can be used for the fusing and also for the cutting operation in a single working step.

DRAWINGS

Further features and advantages of the invention will become apparent from the following description with reference to the drawing Figures, wherein it is shown by FIG. 1 is a schematic representation of a battery including separators according to the invention;

DETAILED DESCRIPTION

Figure 1:
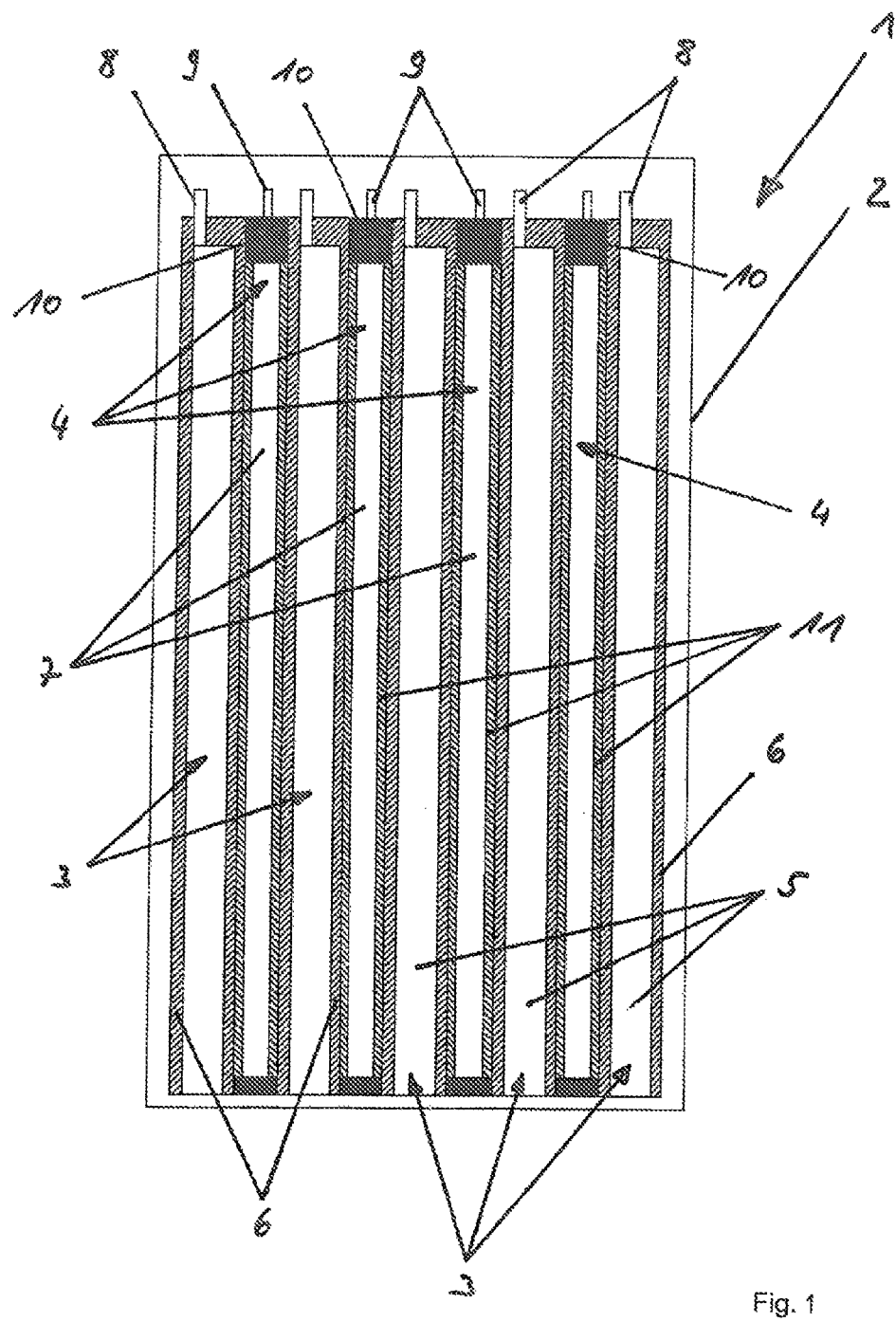

FIG. 1 shows merely schematically a battery 1. In a manner known per se, said battery 1 has a battery housing 2 receiving negative electrodes 3 on the one hand and positive electrodes 4 on the other hand in an alternating fashion The negative electrodes 3 each have an electrode plate 5 that is surrounded by a separator 6.

The positive electrodes 4 are configured as tubular plates 7 and thus have cores, which are respectively disposed in pockets of a tube pocket 11.

On their upper outer edge, said electrodes 3 and 4 each have a current-collecting lug, the negative electrodes 3 each presenting a lug 8 and the positive electrodes 4 each presenting a lug 4. In the illustrated embodiment, the positive electrodes 4 are provided with a protective cap 10, preferably from plastic. This protective cap 10 covers the conducting bridge connecting the cores of the positive electrode 4. The plastic cap 10 is provided with a corresponding recess for the lug 9 to pass through.

Figure 2:
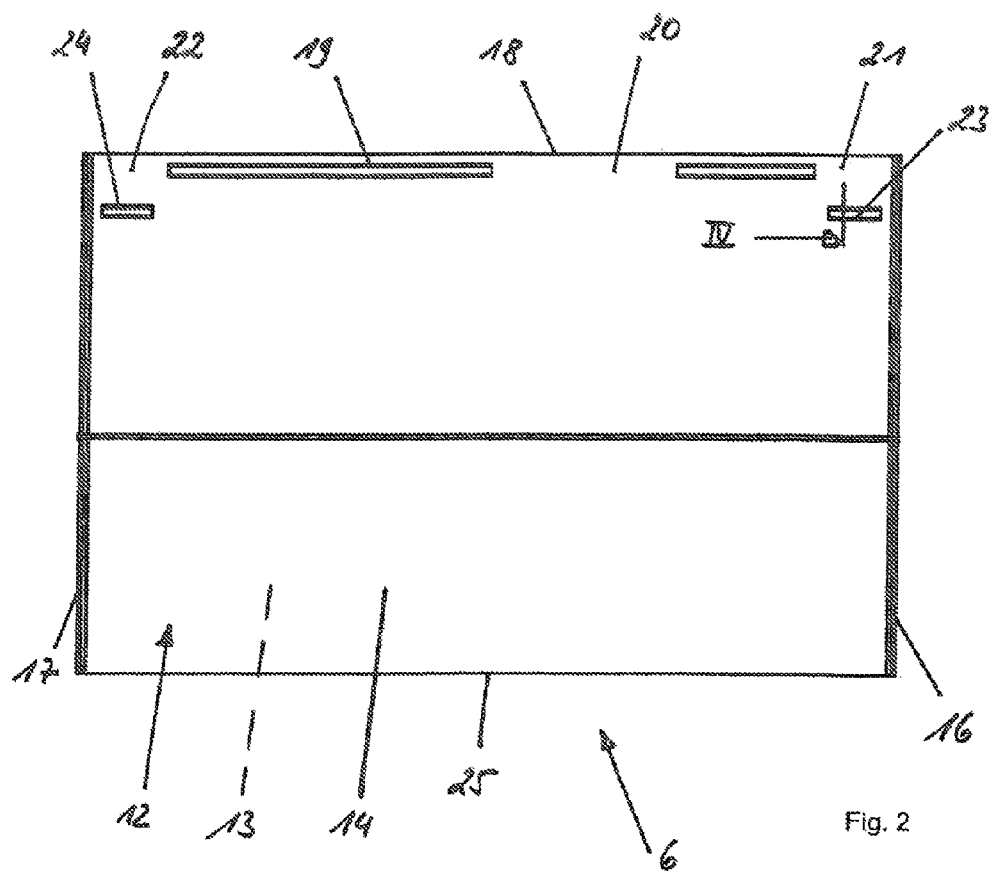
FIG. 2 is a schematic lateral view of a separator according to the invention.
Figure 3:
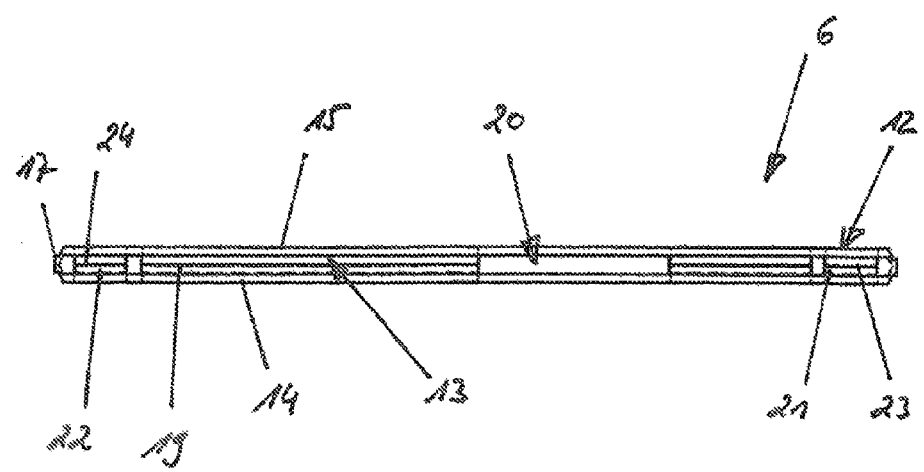
FIG. 3 is a schematic top view of the separator according to FIG. 2.
Figure 4:
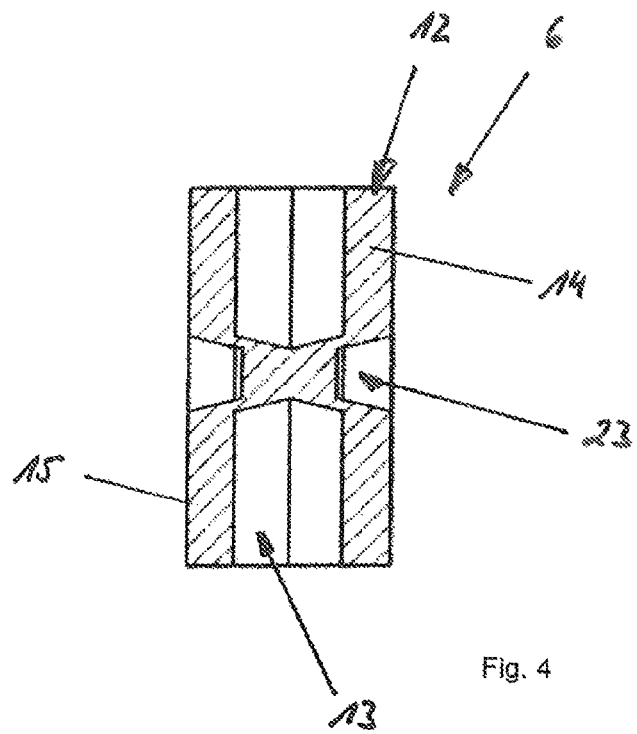
FIG. 4 is a detail of the separator of FIG. 1, according to line A-A.
Figure 5:
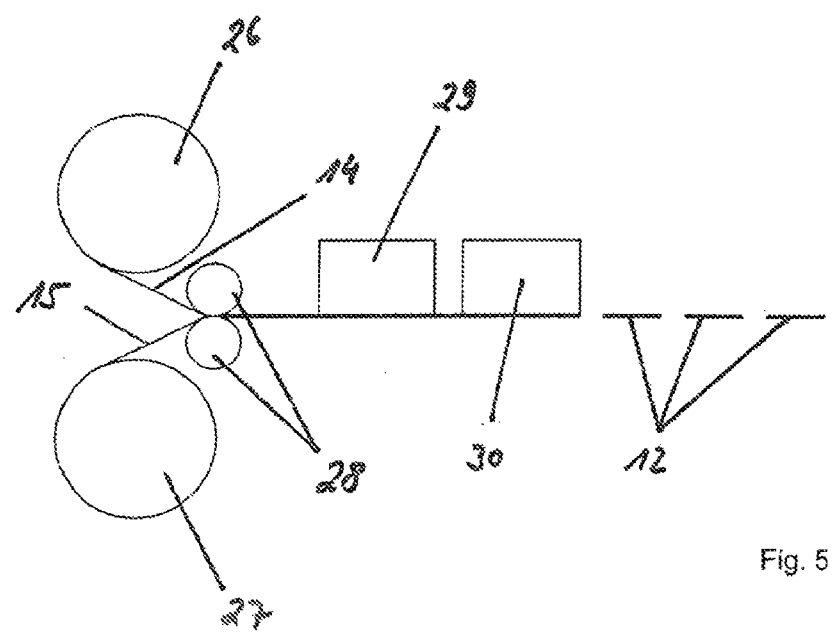
FIG. 5 is a schematic representation of the procedure according to the invention.

The separators 6 of the negative electrodes 3 are each configured as separator pockets 12 as shown in detail in the FIGS. 2, 3 and 4.

As can be seen from a combined consideration of FIGS. 2 and 3, the separator 6 according to the invention is designed as a separator pocket 12. The same provides a receiving space 13 for the electrode plate 5, which is received by the separator 6 when used as intended.

The separator pocket 12 has two separator sheets 14 and 15 bearing on each other, which are welded to each other along their respective longitudinal sides 16 and 17. The upper front sides 18 of the separator sheets 14 and 15 are also welded to each other, the welding seam 19 interconnecting the upper front sides 18 including an interruption that forms a recess 20 for a lug 8 disposed on the upper outer edge of the electrode plate 5 to pass through. This factual relationship will become apparent particularly from the illustration according to FIG. 2.

According to the invention, for forming a degasification opening 21, said welding seam 19 is interrupted in a rim portion adjacent to one longitudinal side 16. Under normal use, this degasification opening 21 serves to discharge gases produced at the electrode plate 5 from the separator pocket 12 in order to prevent swelling of the separator pocket 12. Additionally, the discharge of gases produced particularly ensures that said electrode plate is not occupied by gases so that a contact between the electrode plate and the electrolyte is always possible without hindrance. It is therefore possible to effectively prevent partial failures of the electrode plate 5 due to an undesirable occupation by gases.

A second welding seam 23 is provided in a manner spaced from the first welding seam 19 and positioned directly vis-à-vis the degasification opening 21 thus providing a labyrinth duct for gas flowing out from the separator pocket 12.

Because the welding seam 23 is spaced from the first welding seam 19, it also serves as a spacer for an electrode plate 5 received by the separator pocket 12. Thus a clearance between the upper outer edge of the electrode plate 5 on the one hand and the upper welding seam 19 of the separator pocket 12 on the other hand is ensured in the finally assembled state.

The illustrated embodiment includes an additional degasification opening 22. The same is formed as an interruption of the first welding seam 19, namely in a rim portion adjacent to the other longitudinal side 17. Across from said degasification opening 22 a third welding seam 24 is provided, which is positioned directly vis-à-vis the second degasification opening 22.

The welding seams 23 and 24 are equally spaced from the first welding seam 19, the distance in the illustrated embodiment being 1.5 cm.

The detailed view according to FIG. 4 shows in a sectional representation the configuration of the second welding seam 23.

FIG. 4 schematically represents the procedure according to the invention.

Endless separator sheets 14 and 15 uncoiled from corresponding rolls 26 and 27 and guided via corresponding deflection pulleys 28 are used for the manufacture of the separator pocket 12. Both separator sheets 14 and 15 are laid on top of each other by means of said deflection pulleys 28. At a first welding station 29 said separator sheets 14 and 15 are welded to each other along their longitudinal sides 16 and 17, i.e. in the endless direction.

At a second welding station 30, the welding seams 19, 23 and 24 running transversely to the longitudinal sides 16 and 17 are formed simultaneously with cutting. The cutting operation is preferably performed by full penetration welding so that separate cutting machines are not required.

The result of this procedure is a separator pocket 12, which is configured as illustrated in the FIGS. 2 to 4. The separator pocket 12 can be equipped with an electrode plate 5 via the lower, unsealed outer edge 25 of the separator pocket 12.

What is claimed is:

1. A separator for an electrode plate of a plate-shaped electrode of a battery, particularly a lead-acid battery, comprising:
a separator pocket providing a receiving space for said electrode plate and having two separator sheets bearing on each other, which are welded to each other along their respective longitudinal sides and upper front sides, the welding seam interconnecting the upper front sides presenting an interruption forming a recess for a current-collecting lug disposed on the upper outer edge of the electrode plate to pass through, wherein, the welding seam, for forming a degasification opening, is interrupted in a rim portion adjacent to one longitudinal side, a second welding seam spaced from said welding seam being provided and positioned directly vis-à-vis the degasification opening of the first welding seam.

2. The separator according to claim 1, wherein the first welding seam, for forming an additional degasification opening, is interrupted in a rim portion adjacent to the other longitudinal side.

3. The separator according to claim 2, wherein a third welding seam spaced from the first welding seam is provided which is positioned directly vis-à-vis the additional degasification opening.

4. The separator according to claim 3, wherein the second and the third welding seams are configured so as to be equally spaced from the first welding seam.

5. The separator according to claim 3, wherein the second and the third welding seams each have an extent which substantially corresponds to the extent of the respectively associated degasification opening.

6. The separator according to claim 2, wherein the distance of the second and third welding seams to the upper front sides of the separator sheets is 0.5 cm to 2.5 cm, preferably 1.0 cm to 2.0 cm, even more preferably 1.5 cm.

7. The separator according to claim 1, wherein the separator sheets of the separator pocket are connected and preferably welded to each other along their lower front sides opposing the first welding seam.

8. The separator according to claim 1, wherein the separator pocket is configured so as to be open along its lower outer edge opposing the first welding seam.

* * * * *